United States Patent
Uehara et al.

(10) Patent No.: US 9,091,891 B2
(45) Date of Patent: Jul. 28, 2015

(54) LIQUID CRYSTAL OPTICAL APPARATUS AND STEREOSCOPIC IMAGE DISPLAY DEVICE

(75) Inventors: Shinichi Uehara, Tokyo (JP); Masako Kashiwagi, Kanagawa-ken (JP); Ayako Takagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 301 days.

(21) Appl. No.: 13/614,051

(22) Filed: Sep. 13, 2012

(65) Prior Publication Data

US 2013/0222714 A1  Aug. 29, 2013

(30) Foreign Application Priority Data

Feb. 27, 2012  (JP) ................. 2012-040644

(51) Int. Cl.
- *G02F 1/1343* (2006.01)
- *H04N 13/02* (2006.01)
- *G02F 1/29* (2006.01)
- *G02B 27/22* (2006.01)
- *G02B 3/08* (2006.01)

(52) U.S. Cl.
CPC ............ *G02F 1/134309* (2013.01); *G02F 1/29* (2013.01); *H04N 13/0235* (2013.01); *G02B 3/08* (2013.01); *G02B 27/225* (2013.01); *G02B 27/2214* (2013.01); *H04N 2213/001* (2013.01)

(58) Field of Classification Search
None
See application file for complete search history.

(56) References Cited

U.S. PATENT DOCUMENTS

| 5,493,427 A | 2/1996 | Nomura et al. |
| 2010/0238276 A1 | 9/2010 | Takagi et al. |
| 2012/0069255 A1 | 3/2012 | Takagi et al. |
| 2012/0127417 A1* | 5/2012 | Sakurai et al. ............... 349/141 |

FOREIGN PATENT DOCUMENTS

| CN | 102341743 A | 2/2012 |
| CN | 102472933 A | 5/2012 |

(Continued)

OTHER PUBLICATIONS

Notification of Reason(s) for Refusal issued by the Japanese Patent Office on Apr. 16, 2014, for Japanese Patent Application No. 2012-040644, and English-language translation thereof.

(Continued)

*Primary Examiner* — Richard Kim

(74) *Attorney, Agent, or Firm* — Finnegan, Henderson, Farabow, Garrett & Dunner, L.L.P.

(57) ABSTRACT

According to one embodiment, a liquid crystal optical apparatus includes a first substrate unit, a second substrate unit, and a liquid crystal layer. The first substrate unit includes a first substrate having a first major surface and first electrodes provided on the first major surface to extend along a first direction, and arranged in a direction non-parallel to the first direction. The second substrate unit includes a second substrate having a second major surface opposing the first major surface and a second electrode provided on the second major surface to oppose the first electrodes. The liquid crystal layer is provided between the first and second substrate units. One of the first electrodes includes a first main body portion and a first tip portion. The first main body portion extends along the first direction, and the first tip portion is provided at a tip of the first main body portion.

20 Claims, 6 Drawing Sheets

(56) References Cited

FOREIGN PATENT DOCUMENTS

| | | |
|---|---|---|
| JP | 7-77748 | 3/1995 |
| JP | 2000-102038 | 4/2000 |
| JP | 2000-292802 | 10/2000 |
| JP | 2010-224191 | 10/2010 |

OTHER PUBLICATIONS

Notification of the First Office Action issued by the State Intellectual Property Office of the People's Republic of China on Apr. 3, 2015, for Chinese Patent Application No. 201210352008.5, and English-language translation thereof.

* cited by examiner

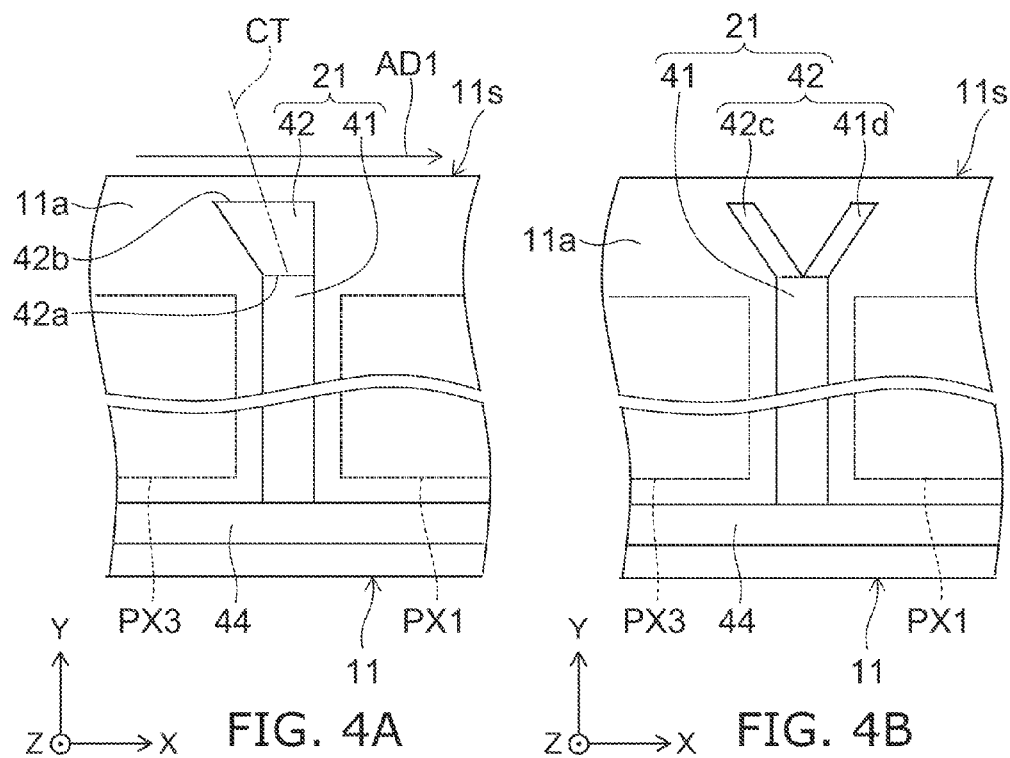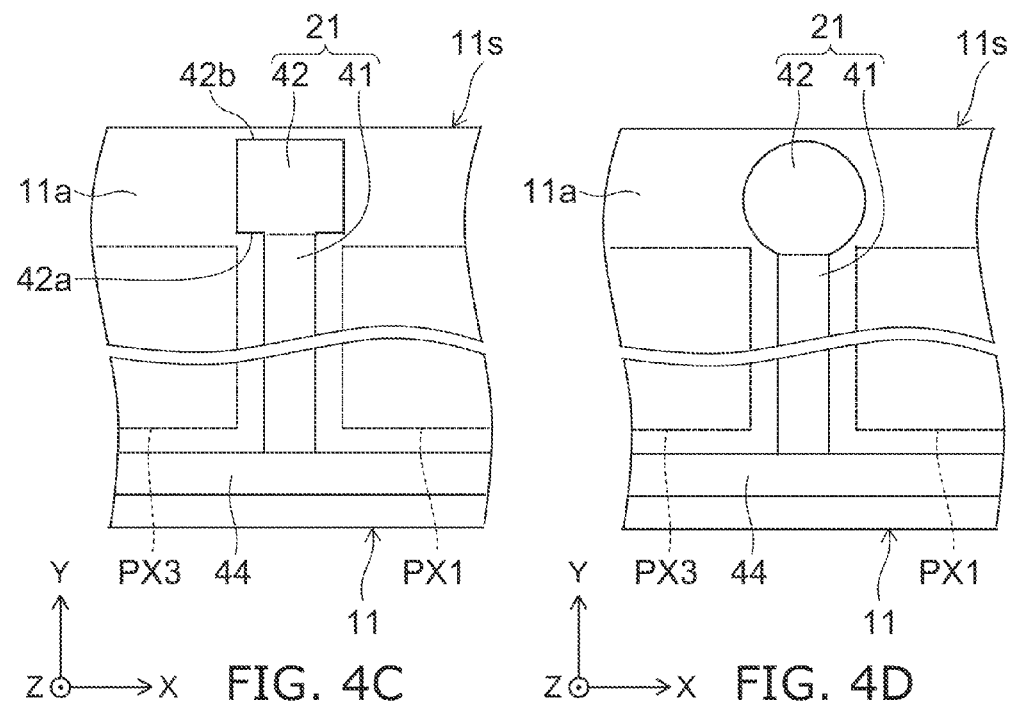

US 9,091,891 B2

LIQUID CRYSTAL OPTICAL APPARATUS AND STEREOSCOPIC IMAGE DISPLAY DEVICE

CROSS-REFERENCE TO RELATED APPLICATIONS

This application is based upon and claims the benefit of priority from the prior Japanese Patent Application No. 2012-040644, filed on Feb. 27, 2012; the entire contents of which are incorporated herein by reference.

FIELD

Embodiments described herein relate generally to a liquid crystal optical apparatus and a stereoscopic image display device

BACKGROUND

A liquid crystal optical apparatus is known in which the distribution of the refractive index is changed according to the application of a voltage by utilizing the birefringence of liquid crystal molecules. There exists a stereoscopic image display device that combines an image display unit with such a liquid crystal optical apparatus.

By changing the distribution of the refractive index of the liquid crystal optical apparatus, the stereoscopic image display device switches between a state in which the image displayed on the image display unit is incident on the eyes of the human viewer as displayed on the image display unit and a state in which the image displayed on the image display unit is incident on the eyes of the human viewer as multiple parallax images. Thereby, a high definition two-dimensional image display operation and a three-dimensional image display operation are realized, where the three-dimensional image display operation includes stereoscopic viewing with the naked eyes due to the multiple parallax images. It is desirable to realize good optical characteristics of the liquid crystal optical apparatus used in the stereoscopic image display device.

BRIEF DESCRIPTION OF THE DRAWINGS

FIG. 4A to FIG. 4D are schematic top views of the configuration of a portion of other stereoscopic image display devices according to the first embodiment;

DETAILED DESCRIPTION

Figure 1A:
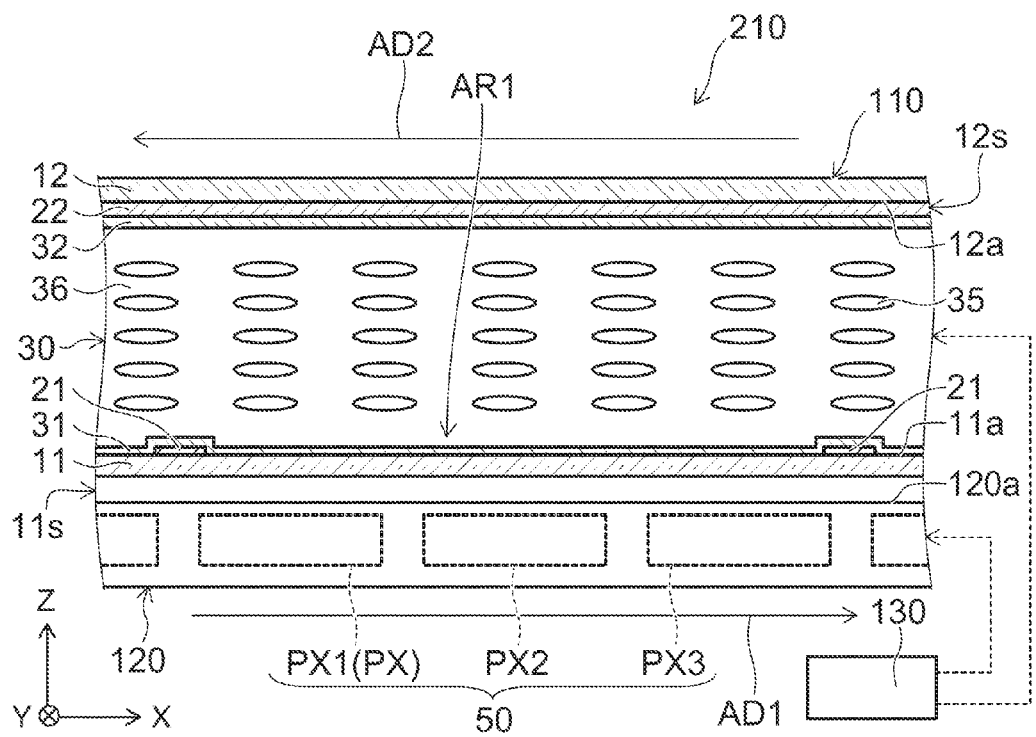
FIG. 1A and FIG. 1B are schematic views of a stereoscopic image display device according to a first embodiment.

According to one embodiment, a liquid crystal optical apparatus includes a first substrate unit, a second substrate unit, and a liquid crystal layer. The first substrate unit includes a first substrate and a plurality of first electrodes. The first substrate has a first major surface. The plurality of first electrodes are provided on the first major surface to extend along a first direction. The first electrodes are arranged in a direction non-parallel to the first direction. The second substrate unit includes a second substrate and a second electrode. The second substrate has a second major surface opposing the first major surface. The second electrode is provided on the second major surface to oppose the first electrodes. The liquid crystal layer is provided between the first substrate unit and the second substrate unit. At least one of the first electrodes includes a first main body portion and a first tip portion. The first main body portion extends along the first direction. The first main body portion has a first width along a second direction parallel to the first major surface and perpendicular to the first direction. The first tip portion is provided at a tip of the first main body portion. The first tip portion has a second width along the second direction wider than the first width.

According to one embodiment, a stereoscopic image display device includes a liquid crystal optical apparatus and an image display unit. The image display unit is stacked with the liquid crystal optical apparatus. The image display unit has a display surface configured to display an image. The liquid crystal optical apparatus includes a first substrate unit, a second substrate unit, and a liquid crystal layer. The first substrate unit includes a first substrate and a plurality of first electrodes. The first substrate has a first major surface. The plurality of first electrodes are provided on the first major surface to extend along a first direction. The first electrodes are arranged in a direction non-parallel to the first direction. The second substrate unit includes a second substrate and a second electrode. The second substrate has a second major surface opposing the first major surface. The second electrode is provided on the second major surface to oppose the first electrodes. The liquid crystal layer is provided between the first substrate unit and the second substrate unit. At least one of the first electrodes includes a first main body portion and a first tip portion. The first main body portion extends along the first direction. The first main body portion has a first width along a second direction parallel to the first major surface and perpendicular to the first direction. The first tip portion is provided at a tip of the first main body portion. The first tip portion has a second width along the second direction wider than the first width.

Various embodiments will be described hereinafter with reference to the accompanying drawings.

The drawings are schematic or conceptual; and the relationships between the thicknesses and the widths of portions, the proportions of sizes between portions, etc., are not necessarily the same as the actual values thereof. The dimensions and/or the proportions may be illustrated differently among the drawings, even for identical portions.

In the specification and the drawings of the application, components similar to those described in regard to a drawing thereinabove are marked with like reference numerals, and a detailed description is omitted as appropriate.

First Embodiment

Figure 1B:
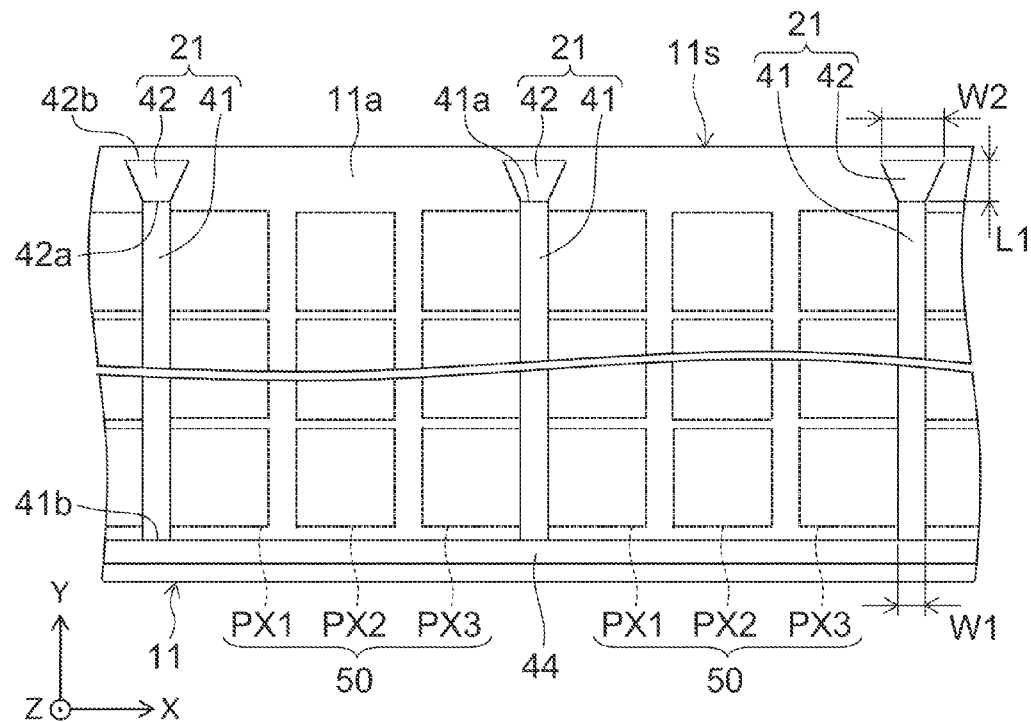

FIG. 1A and FIG. 1B are schematic views illustrating the configuration of a stereoscopic image display device according to a first embodiment.

FIG. 1A is a schematic cross-sectional view illustrating the configuration of the stereoscopic image display device 210.

FIG. 1B is a schematic top view illustrating the configuration of a portion of the stereoscopic image display device 210.

As shown in FIG. 1A, the stereoscopic image display device 210 includes a liquid crystal optical apparatus 110, an image display unit 120, and a drive unit 130.

The image display unit 120 has a display surface 120a that displays an image. The display surface 120a has, for example, a rectangular configuration.

The liquid crystal optical apparatus 110 is provided on the display surface 120a. For example, the liquid crystal optical apparatus 110 covers the display surface 120a. The liquid crystal optical apparatus 110 functions as, for example, a liquid crystal GRIN lens (Gradient Index lens). The distribution of the refractive index of the liquid crystal optical apparatus 110 is changeable. One state of the distribution of the refractive index corresponds to a first state in which the image displayed on the display surface 120a is incident on the eyes of the human viewer as displayed on the display surface 120a. Another state of the refractive index distribution corresponds to a second state in which the image displayed on the image display unit 120 is incident on the eyes of the human viewer as multiple parallax images.

By causing the distribution of the refractive index of the liquid crystal optical apparatus 110 to change in the stereoscopic image display device 210, it is possible to selectively switch between a display of a two-dimensional image (called a 2D display hereinbelow) and a display of a three-dimensional image (called a 3D display hereinbelow) for which stereoscopic viewing is possible with the naked eyes. The drive unit 130 is electrically connected to the liquid crystal optical apparatus 110. In this example, the drive unit 130 also is electrically connected to the image display unit 120. The drive unit 130 controls the operations of the liquid crystal optical apparatus 110 and the image display unit 120. For example, the drive unit 130 performs the switching between the first state and the second state of the liquid crystal optical apparatus 110. An image signal is input to the drive unit 130 by using a recording medium, an external input, etc. The drive unit 130 controls the operation of the image display unit 120 based on the image signal that is input. Thereby, an image corresponding to the image signal that is input is displayed on the display surface 120a. The drive unit 130 may be included in the image display unit 120. Or, for example, the drive unit 130 may be included in the liquid crystal optical apparatus 110. For example, only the portion of the drive unit 130 relating to driving the liquid crystal optical apparatus 110 may be included in the liquid crystal optical apparatus 110.

In the case where the drive unit 130 performs the 2D display, the drive unit 130 switches the liquid crystal optical apparatus 110 to the first state and causes the image display unit 120 to display the image for the 2D display. On the other hand, in the case where the drive unit 130 performs the 3D display, the drive unit 130 switches the liquid crystal optical apparatus 110 to the second state and causes the image display unit 120 to display the image for the 3D display.

The liquid crystal optical apparatus 110 includes a first substrate unit 11s, a second substrate unit 12s, and a liquid crystal layer 30. The first substrate unit 11s includes a first substrate 11 and a first electrode 21. The second substrate unit 12s includes a second substrate 12 and a second electrode 22.

The first substrate 11 has a first major surface 11a. The second substrate 12 has a second major surface 12a opposing the first major surface 11a. The first major surface 11a is substantially parallel to the second major surface 12a. The first electrode 21 is multiply provided on the first major surface 11a. Each of the multiple first electrodes 21 extends along a first direction; and the multiple first electrodes 21 are arranged in a direction non-parallel to the first direction. For example, the multiple first electrodes 21 are disposed in a second direction perpendicular to the first direction with spacing between the multiple first electrodes 21. For example, the spacing between the multiple first electrodes 21 is constant.

A direction perpendicular to the first major surface 11a and the second major surface 12a is taken as a Z-axis direction. One direction perpendicular to the Z-axis direction is taken as an X-axis direction. A direction perpendicular to the Z-axis direction and the X-axis direction is taken as a Y-axis direction. In this example, the Y-axis direction is taken to be the first direction. The X-axis direction is taken to be the second direction. However, in the embodiments, the first direction may be any direction perpendicular to the Z-axis direction; and the first direction may be any direction along the first major surface 11a.

In this example, one side of two mutually perpendicular sides of the rectangular display surface 120a is parallel to the X-axis direction; and the other side is parallel to the Y-axis direction. The orientation of the sides of the display surface 120a is not limited thereto and may include any direction perpendicular to the Z-axis direction.

The second substrate unit 12s opposes the first substrate unit 11s. The second major surface 12a of the second substrate 12 opposes the first major surface 11a. The second electrode 22 is provided on the second major surface 12a. The second electrode 22 opposes each of the multiple first electrodes 21. The second electrode 22 is larger than the first electrode 21 and covers the first electrode 21 when viewed in the Z-axis direction.

The multiple first electrodes 21 and the second electrode 22 are electrically connected to the drive unit 130 by not-illustrated interconnects. The application of the voltage (the setting of the potential) to the multiple first electrodes 21 and the second electrode 22 is controlled by the drive unit 130. The switching between the first state and the second state of the liquid crystal optical apparatus 110 is performed by applying the voltage to the multiple first electrodes 21 and the second electrode 22.

The liquid crystal layer 30 is provided between the first substrate unit 11s and the second substrate unit 12s. The liquid crystal layer 30 includes a liquid crystal material 36 that includes multiple liquid crystal molecules 35. The liquid crystal material 36 is a liquid crystal medium. The liquid crystal layer 30 may include, for example, a nematic liquid crystal. The dielectric anisotropy of the liquid crystal layer 30 is positive or negative. Hereinbelow, the case will be described where a nematic liquid crystal having a positive dielectric anisotropy is used as the liquid crystal layer 30.

The first substrate unit 11s further includes a first alignment film (an alignment film) 31. The first alignment film 31 is provided between the first substrate 11 and the liquid crystal layer 30. The first alignment film 31 also is provided between the liquid crystal layer 30 and the multiple first electrodes 21. In other words, the first alignment film 31 is provided on the first substrate 11 to cover the first major surface 11a and the multiple first electrodes 21. An alignment processing from one X-axis direction toward one other X-axis direction is performed on the first alignment film 31. For example, a direction AD1 of the alignment processing of the first alignment film 31 is the direction from the left toward the right (the +X direction) in the illustrated state.

The second substrate unit 12s further includes a second alignment film 32. The second alignment film 32 is provided between the second substrate 12 and the liquid crystal layer 30.

The second alignment film 32 is provided between the second electrode 22 and the liquid crystal layer 30. The second alignment film 32 is provided on the second major surface 12a of the second substrate 12 to cover the second electrode 22. An alignment processing from the one other X-axis direction toward the one X-axis direction is performed on the second alignment film 32. For example, a direction AD2 of the alignment processing of the second alignment film 32 is the direction from the right toward the left (the −X direction) in the illustrated state. In other words, the direction AD1 of the alignment processing of the first alignment film 31 and the direction AD2 of the alignment processing of the second alignment film 32 are non-parallel.

By the alignment processing recited above, the first alignment film 31 and the second alignment film 32 cause the liquid crystal molecules 35 to have a horizontal alignment (that is, parallel alignment). In such a case, the liquid crystal molecules 35 have a prescribed pretilt angle according to the directions of the alignment processing. The first alignment film 31 and the second alignment film 32 cause the director (the long axis) of the liquid crystal molecules 35 to be oriented in the X-axis direction. Thereby, the liquid crystal material 36 has the horizontal alignment in the state (the state illustrated in FIGS. 1A and 1B) in which the voltage is not applied to the multiple first electrodes 21 and the second electrode 22.

Herein, the horizontal alignment includes, for example, the state in which the long axis of the liquid crystal molecules 35 is within a range of not less than 0° and not more than 30° when the direction perpendicular to the Z-axis direction is taken to be 0°. In other words, the pretilt angle of the horizontal alignment is, for example, not less than 0° and not more than 30°. The liquid crystal layer 30 may have a vertical alignment or a hybrid alignment (HAN alignment).

The first substrate 11, the second substrate 12, the first electrode 21, and the second electrode 22 may include, for example, a transparent material. The light including the image displayed on the image display unit 120 passes through the first substrate 11, the second substrate 12, the first electrode 21, and the second electrode 22.

The first substrate 11 and the second substrate 12 may include, for example, glass, a resin, etc. The first electrode 21 and the second electrode 22 may include, for example, an oxide including at least one element selected from the group consisting of In, Sn, Zn, and Ti. The first electrode 21 and the second electrode 22 may include, for example, ITO. The first electrode 21 and the second electrode 22 may be, for example, at least one selected from $In_2O_3$ and $SnO_3$. The first electrode 21 and the second electrode 22 may be, for example, thin metal layers.

The first alignment film 31 and the second alignment film 32 may include, for example, a resin such as polyimide. The film thicknesses of the first alignment film 31 and the second alignment film 32 are, for example, 200 nm (e.g., not less than 100 nm and not more than 300 nm).

As illustrated in FIG. 1B, each of the multiple first electrodes 21 includes a main body portion 41 (a first main body portion) and a tip portion 42 (a first tip portion). The main body portion 41 has a band configuration extending along the Y-axis direction. A width W1 (a first width) of the main body portion 41 along the X-axis direction is constant. The width W1 is substantially the same along the Y-axis direction.

Herein, the width W1 of the main body portion 41 along the X-axis direction being constant (substantially the same) refers to, for example, the state in which the change amount of the width W1 of the main body portion 41 along the X-axis direction is not more than ±5%.

The tip portion 42 is provided at a tip 41a of the main body portion 41. A width W2 (a second width) of the tip portion 42 along the X-axis direction is wider than the width W1 of the main body portion 41 along the X-axis direction. The tip portion 42 includes a first end portion 42a connected to the tip 41a of the main body portion 41 and a second end portion 42b on the side opposite to the first end portion 42a in the Y-axis direction. The width W2 of the tip portion 42 along the X-axis direction gradually widens from the first end portion 42a toward the second end portion 42b. For example, the width W2 monotonously increases from the first end portion 42a toward the second end portion 42b. A length L1 of the tip portion 42 along the Y-axis direction is greater than the width W1 of the main body portion 41 along the X-axis direction. The length L1 is not more than 50 times the width W1 of the main body portion 41 along the X-axis direction. For example, the length L1 is not more than 5 times the distance (the pitch of the first electrodes 21) between the second-direction centers of the mutually adjacent first electrodes 21.

The width W1 is, for example, not less than 5 μm and not more than 200 μm. The pitch of the first electrodes 21 is, for example, not less than 4 times the width W1 and not more than 20 times the width W1. The pitch of the first electrodes 21 is, for example, not less than 10 μam and not more than 4000 μm. The length of the main body portion 41 along the first direction is, for example, not less than 50 mm and not more than 2000 mm.

The length of the first electrode 21 in the Y-axis direction is slightly longer than the length of the display surface 120a in the Y-axis direction. Thereby, the first electrode 21 crosses the display surface 120a in the Y-axis direction. The first substrate unit 11s further includes a connection unit 44. The connection unit 44 is connected to the end portion (a power supply terminal 41b) of the main body portion 41 on the side opposite to the tip 41a. For example, the connection unit 44 is used for the electrical connection of the first electrode 21. The width of the connection unit 44 along the X-axis direction is wider than the width W1 of the main body portion 41 along the X-axis direction. In this example, each of the multiple first electrodes 21 is connected to one connection unit 44. The configuration including the multiple first electrodes 21 and the connection unit 44 is a comb-like configuration. A voltage can be applied to each of the multiple first electrodes 21 by applying the voltage to the connection unit 44. The connection unit 44 may include, for example, the material of the first electrode 21 and the second electrode 22. The connection unit 44 may be multiply provided to correspond to each of the multiple first electrodes 21. For example, the length of the main body portion 41 of the first electrode 21 in the Y-axis direction is longer than the length of the display surface 120a in the Y-axis direction. For example, the main body portion 41 of the first electrode 21 crosses the display surface 120a. For example, at least a portion of the tip portion 42 and the connection unit 44 is provided outside the display surface 120a. For example, at least a portion of the tip portion 42 and the connection unit 44 does not overlap the display surface 120a when viewed in the Z-axis direction.

The image display unit 120 includes the multiple pixel groups 50 arranged in a two-dimensional matrix configuration. The display surface 120a is formed of the multiple pixel groups 50. The pixel group 50 includes, for example, a first pixel PX1, a second pixel PX2, and a third pixel PX3. Hereinbelow, the first pixel PX1 to the third pixel PX3 are collectively called the pixels PX. The pixel group 50 is disposed to oppose a region AR1 between two adjacent (e.g., most proximal) first electrodes 21. The first pixel PX1 to the third pixel PX3 included in the pixel group 50 are arranged in the X-axis direction. The number of multiple pixels PX included in the pixel group 50 is not limited to three, and may be two, four, or more.

For example, the image display unit 120 emits the light including the image to be displayed on the display surface 120a. This light is in a linearly polarized light state travelling substantially in the Z-axis direction. The polarizing axis of the linearly polarized light (the orientation axis of the vibration plane of the electric field in the X-Y plane) is the X-axis direction. In other words, the polarizing axis of the linearly polarized light is in a direction parallel to the director (the long axis) of the liquid crystal molecules 35. For example, the linearly polarized light is formed by disposing an optical filter (a polarizer) having the X-axis direction as the polarizing axis in the optical path.

As illustrated in FIG. 1A, each of the multiple liquid crystal molecules 35 included in the liquid crystal layer 30 has a horizontal alignment in the case where the voltage is not applied to the multiple first electrodes 21 and the second electrode 22. Thereby, there is a substantially uniform refractive index distribution in the X-axis direction and the Y-axis direction. Therefore, in the case where the voltage is not applied, the travel direction of the light including the image to be displayed on the image display unit 120 is substantially unchanged. In the case where the voltage is not applied, the liquid crystal optical apparatus 110 is switched to the first state.

For example, the drive unit 130 applies the voltage between the multiple first electrodes 21 and the second electrode 22 in the case where the liquid crystal optical apparatus 110 is switched from the first state to the second state. For example, the drive unit 130 causes the absolute value (the effective value (for example, root-mean square value)) of the voltage of the multiple first electrodes 21 to be relatively higher than the absolute value (the effective value) of the voltage of the second electrode 22. For example, the drive unit 130 grounds the second electrode 22. Thus, the drive unit 130 applies a voltage that is different from that of the second electrode 22 to the first electrode 21 which has the main body portion 41 and the tip portion 42.

Figure 2A:
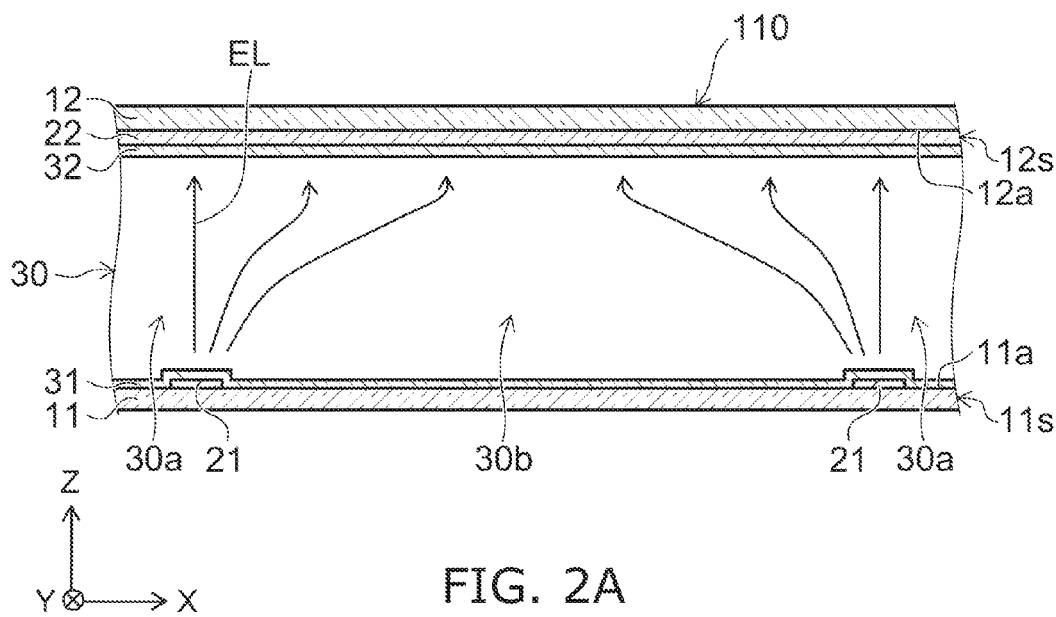
FIG. 2A and FIG. 2B are schematic cross-sectional views of the configuration of a portion of the stereoscopic image display device according to the first embodiment.
Figure 2B:
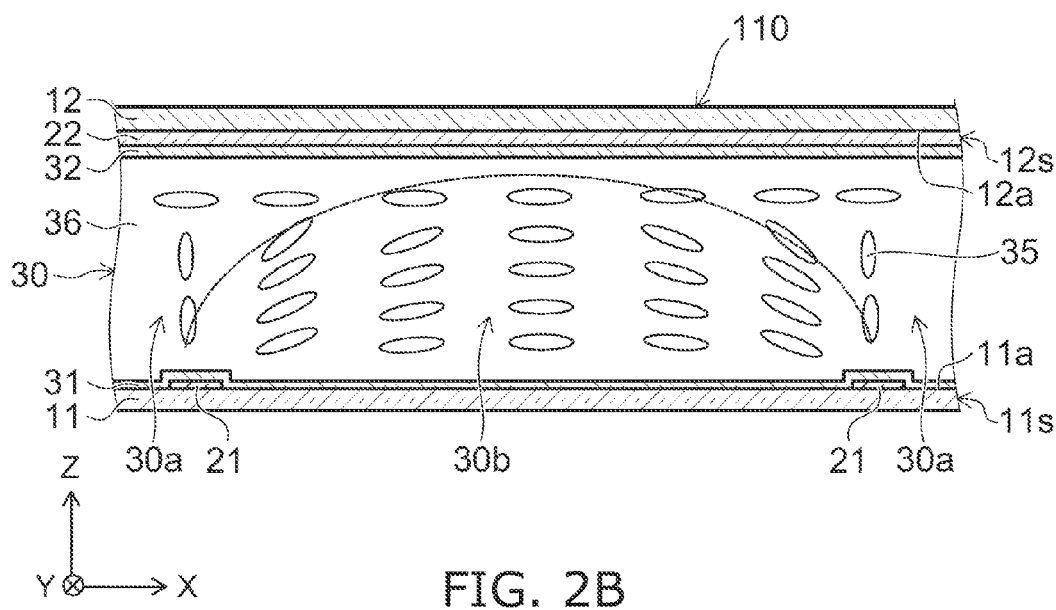

FIG. 2A and FIG. 2B are schematic cross-sectional views illustrating the configuration of a portion of the stereoscopic image display device according to the first embodiment.

As shown in FIG. 2A, lines of electric force EL from the first electrode 21 toward the second electrode 22 are generated when the voltage is applied to the multiple first electrodes 21 and the second electrodes 22 as recited above. For example, the lines of electric force EL have a horizontally symmetric distribution centered on the first electrode 21.

FIG. 2B is a model-like illustration of the alignment of the liquid crystal molecules 35 of the liquid crystal layer 30. As shown in FIG. 2B, the alignment of the liquid crystal molecules 35 deforms along the paths of the lines of electric force EL in the dense region (i.e., the strong electric field region) of the lines of electric force EL in the case where the dielectric anisotropy of the liquid crystal layer 30 is positive. The tilt angle of the liquid crystal molecules 35 increases in a first portion 30a of the liquid crystal layer 30 where the first electrode 21 opposes the second electrode 22. On the other hand, the liquid crystal molecules 35 in a second portion 30b of the liquid crystal layer 30 proximal to the center of the two mutually adjacent first electrodes 21 remain in the horizontal alignment. The angle (the tilt angle) of the liquid crystal molecules 35 in the portion between the first portion 30a and the second portion 30b changes gradually toward the vertical alignment from the second portion 30b toward the first portion 30a. The angle of the long axis of the liquid crystal molecules 35 changes in the Z-X plane along the lines of electric force EL. The angle of the long axis of the liquid crystal molecules 35 changes with the Y axis as a rotational axis.

The liquid crystal molecules 35 are birefringent. The refractive index with respect to the polarization of the long-axis direction of the liquid crystal molecules 35 is higher than the refractive index of the short-axis direction of the liquid crystal molecules 35. As recited above, when the angle of the liquid crystal molecules 35 is changed, the refractive index of the liquid crystal layer 30 with respect to the linearly polarized light travelling in the Z-axis direction with the polarizing axis oriented in the X-axis direction is high in the second portion 30b of the liquid crystal layer 30 and gradually decreases toward the first portion 30a. Thereby, the refractive index distribution is formed in a convex lens configuration.

The multiple first electrodes 21 extend along the Y-axis direction. Therefore, the refractive index distribution of the liquid crystal layer 30 has a cylindrical lens configuration extending along the Y-axis direction during the voltage application. The multiple first electrodes 21 are arranged along the X-axis direction. Therefore, the refractive index distribution of the liquid crystal layer 30 during the voltage application has a lenticular lens configuration in which cylindrical lenses extending along the Y-axis direction are multiply arranged in the X-axis direction when the liquid crystal layer 30 is viewed as an entirety.

The pixel group 50 of the image display unit 120 is disposed to oppose the region AR1 between the two mutually adjacent first electrodes 21. The refractive index distribution having the convex lens configuration that is formed in the liquid crystal layer 30 opposes the pixel group 50. In the refractive index distribution of the liquid crystal layer 30 of this example, the portion (the second portion 30b) where the refractive index is high opposes the second pixel PX2 disposed in the center of the pixel group 50.

The refractive index distribution of the liquid crystal layer 30 during the voltage application causes the light (the image) emitted from the pixel group 50 to travel toward the eyes of the human viewer. Thereby, the image formed of the multiple first pixels PX1 included in the display surface 120a becomes a first parallax image. The image formed of the multiple second pixels PX2 becomes a second parallax image. The image formed of the multiple third pixels PX3 becomes a third parallax image. The parallax image for the right eye is selectively incident on the right eye of the human viewer; and the parallax image for the left eye is selectively incident on the left eye of the human viewer. Thereby, a 3D display is possible. In other words, in the case where the voltage is applied to the multiple first electrodes 21 and the second electrode 22, the liquid crystal optical apparatus 110 is switched to the second state.

In the case where the liquid crystal optical apparatus 110 is in the first state, the light emitted from the pixel group 50 travels straight and is incident on the eyes of the human viewer. Thereby, a 2D display is possible. In the 2D display, a normal 2D image can be displayed with a resolution greater than that of the 3D display by a factor of the number of parallax images (in this example, three times).

Color filters including the three primary colors RGB may be provided respectively at the multiple pixels PX. Thereby, a color display is possible. Other than the three primary colors RGB, the color filters may further include white (colorless) and other color components.

Thus, the liquid crystal optical apparatus 110 of the stereoscopic image display device 210 switches between the 2D display and the 3D display by changing the refractive index distribution of the liquid crystal layer 30 by whether or not the voltage is applied to the multiple first electrodes 21 and the second electrode 22. In the liquid crystal optical apparatus 110, the tip portion 42 is provided at the tip 41a of the main body portion 41, and the width of the tip portion 42 along the X-axis direction is wider than that of the main body portion 41.

When switching from the first state to the second state in the liquid crystal optical apparatus 110, the direction of the director of the liquid crystal above the first electrode 21 changes from the horizontal alignment toward the vertical alignment. At this time, at least one selected from reverse tilt (reversal of the tilt direction of the liquid crystal) and twist (rotation of the director of the liquid crystal in the X-Y plane) occurs; and disclinations occur. This causes the optical characteristics of the liquid crystal optical apparatus 110 to degrade. For example, at the tip portion of the first electrode 21, the electric field distorts not only along the second direction but also along the first direction. Therefore, at the tip portion of the first electrode 21, alignment disorder of the liquid crystal molecules 35 concentrates easily; and there is a strong tendency for disclinations to occur.

FIG. 3A to FIG. 3D are schematic views illustrating characteristics of stereoscopic image display devices according to the first embodiment.

Figure 3A:
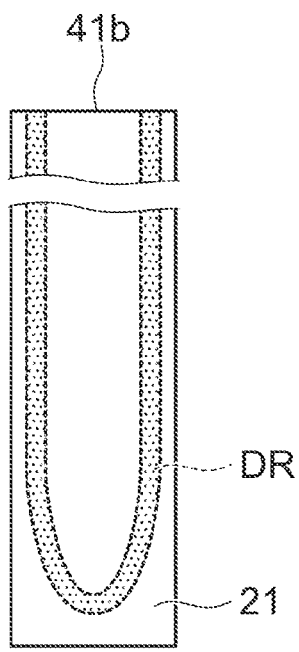
FIG. 3A to FIG. 3D are schematic views illustrating characteristics of stereoscopic image display devices according to the first embodiment.
Figure 3B:
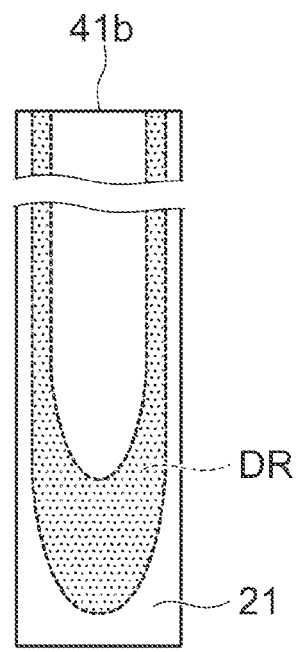
Figure 3C:
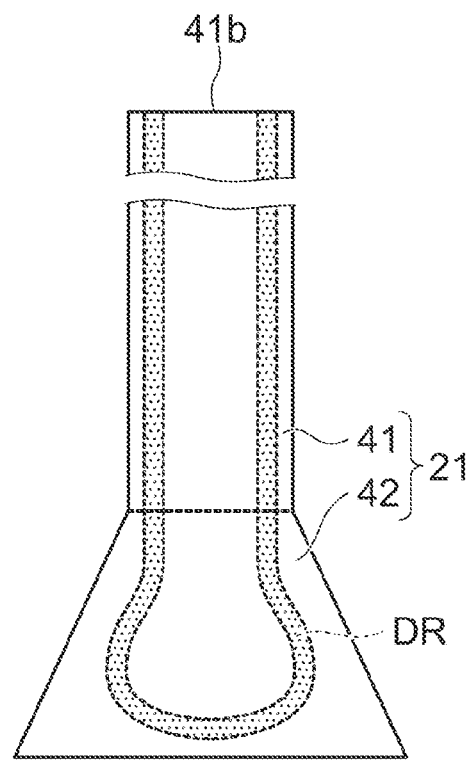
Figure 3D:
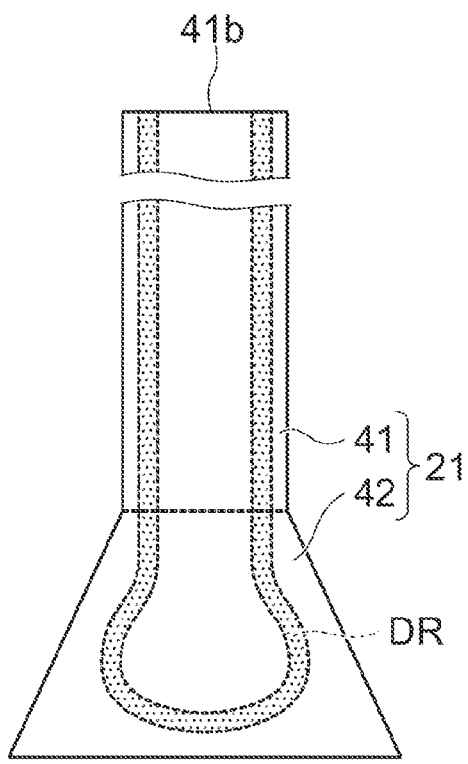

FIG. 3A to FIG. 3D schematically show a region DR of the disclination occurring at the first electrode 21 in the second state. FIG. 3A schematically shows the region DR directly after switching to the second state for the configuration of the first electrode 21 of a reference example in which the width of the first electrode 21 in the X-axis direction is substantially the same along the Y-axis direction. FIG. 3B schematically shows the region DR after a prescribed period of time from the switching to the second state for the configuration of the reference example recited above. FIG. 3C schematically shows the region DR directly after switching to the second state for the first electrode 21 according to the first embodiment. FIG. 3D schematically shows the region DR after the prescribed period of time from the switching to the second state for the first electrode 21 according to the first embodiment.

As shown in FIG. 3A to FIG. 3D, the disclination occurs at the X-axis direction side portions of the first electrode 21. The disclination occurring at both side portions of the first electrode 21 is continuous in an arc configuration at the tip portion 45 of the first electrode 21. It is considered that this phenomenon is caused by an electric field that has a Y-axis direction component occurring at the tip portion.

In the configuration of the reference example as shown in FIG. 3A, the curvature of the disclination at the tip portion of the first electrode 21 is relatively high (the curvature radius is small). In the configuration of the reference example as shown in FIG. 3B, the alignment disorder (the region of the disclination) of the liquid crystal molecules 35 that occurs at the tip portion of the first electrode 21 enlarges over time. In other words, the alignment disorder propagates toward the power supply terminal 41b side over time. The propagation of the alignment disorder along the first electrode 21 having the band configuration is a new technical problem discovered by the inventor of the application.

In the stereoscopic image display device 210, the occurrence of disclinations causes crosstalk of the parallax images and impedes the stereoscopic viewing by the human viewer. The effect of the disclinations occur more markedly in the stereoscopic image display device 210 that uses light-transmissive first electrodes 21 than in a liquid crystal display device or the like that uses metal electrodes.

In the first electrode 21 according to the first embodiment as shown in FIG. 3C, the tip portion 42 is provided to have an X-axis direction width that is wider than that of the main body portion 41. Thereby, the curvature of the disclination occurring at the tip portion 42 can be less than that of the configuration of the reference example. In the first electrode 21 according to the first embodiment as illustrated in FIG. 3D, the propagation of the alignment disorder of the liquid crystal molecules 35 over time is suppressed more than that of the reference example. It is considered that this is caused by the curvature of the disclination at the tip portion 42 increasing and the concentration of the alignment disorder of the liquid crystal molecules 35 being relaxed. For example, it is considered that the concentration of the alignment disorder at the tip portion having a small curvature is one cause of the propagation of the alignment disorder. For example, it is considered that the configuration of the first electrode 21 extending in the band configuration along the Y-axis direction is another cause of the propagation of the alignment disorder.

The inventors of the application performed investigations of the configuration of the first electrode 21 and discovered that the change of the alignment disorder of the liquid crystal molecules 35 over time was suppressed in the configuration in which the tip portion 42 is provided. Thus, in the stereoscopic image display device 210, the propagation of the alignment disorder of the liquid crystal molecules 35 occurring at the tip portion of the first electrode 21 can be suppressed; and the ease of viewing the stereoscopic image display device 210 can be improved. In the stereoscopic image display device 210, the length L1 of the tip portion 42 along the Y-axis direction is greater than the width W1 of the main body portion 41 along the X-axis direction. Thereby, the curvature of the disclination at the tip portion 42 can be appropriately set. For example, the curvature of the disclination increases; and the propagation of the alignment disorder of the liquid crystal molecules 35 is appropriately suppressed. In this example, the tip portion 42 is disposed outside the display surface 120a. Thereby, the negative effect of the alignment disorder of the liquid crystal molecules 35 at the tip portion 42 on the display of the image can be suppressed more appropriately.

FIG. 4A to FIG. 4D are schematic top views illustrating the configuration of a portion of other stereoscopic image display devices according to the first embodiment.

As shown in FIG. 4A, a center CT of the tip portion 42 along the X-axis direction may change from the first end portion 42a toward the second end portion 42b. In such a case, the center CT changes toward one side of the direction AD1 of the alignment processing of the first alignment film 31. In this example, this change is in the left direction of the page surface. In other words, the center CT changes toward the upstream side of the direction AD1 of the alignment processing of the first alignment film 31. The X-axis direction position of the X-axis direction center CT of the tip portion 42 approaches the one direction AD1 of the alignment processing from the first end portion 42a toward the second end portion 42b. The disclinations occur easily on the upstream side of the alignment processing. Therefore, the propagation of the alignment disorder of the liquid crystal molecules 35 can be appropriately suppressed by the center CT changing toward the upstream side of the direction AD1 of the alignment processing of the first alignment film 31.

As shown in FIG. 4B, the tip portion 42 may have a configuration including a first portion 42c and a second portion 42d branching from the first portion 42c. In other words, the configuration of the tip portion 42 may be divided into two forks. The number of branches of the tip portion 42 is not limited to two, and may be three or more. It is sufficient for the tip portion 42 to have at least the first portion 42c and the second portion 42d.

As shown in FIG. 4C, the tip portion 42 may have, for example, a rectangular configuration when projected onto the X-Y plane. In other words, the width W2 of the tip portion 42 along the X-axis direction may be substantially the same from the first end portion 42a toward the second end portion 42b. As illustrated in FIG. 4D, the tip portion 42 may have, for example, a circular configuration when projected onto the X-Y plane.

Second Embodiment

Figure 5A:
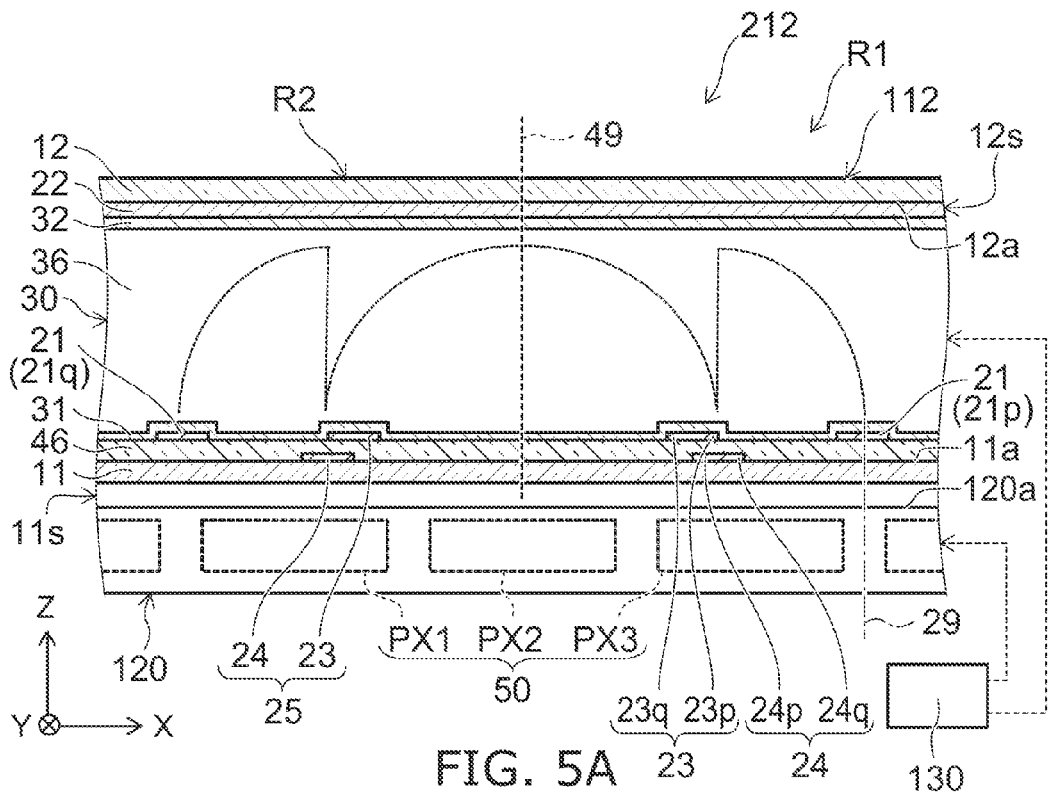
FIG. 5A and FIG. 5B are schematic views of a stereoscopic image display device according to a second embodiment.
Figure 5B:
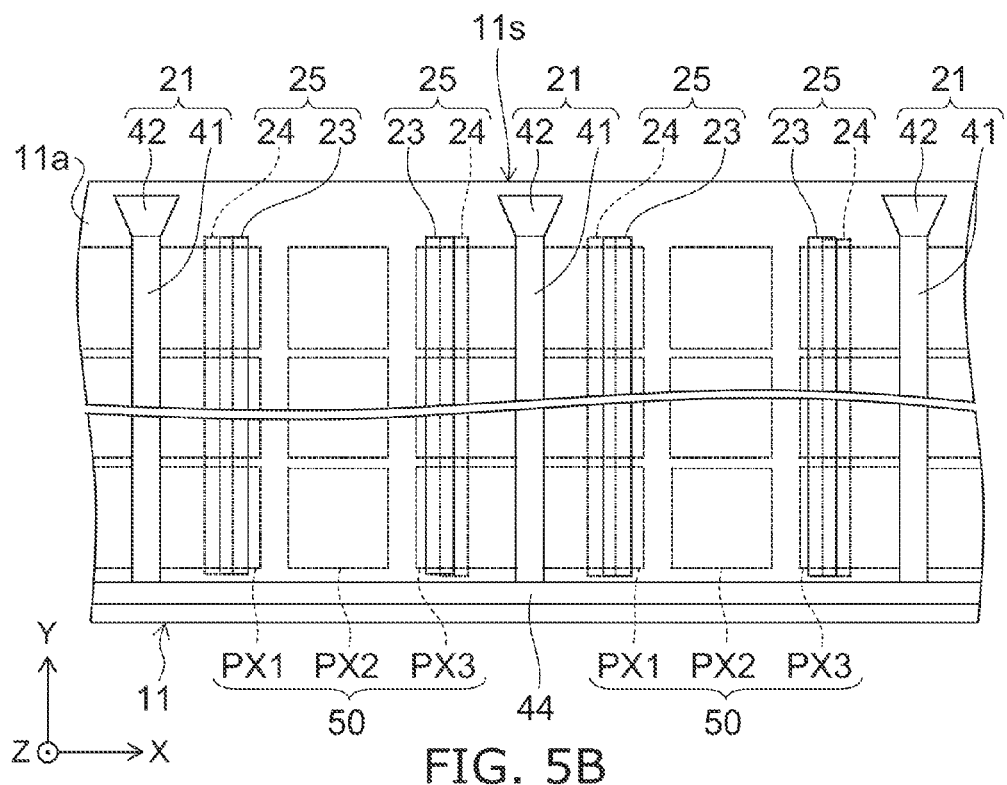

FIG. 5A and FIG. 5B are schematic views illustrating the configuration of a stereoscopic image display device according to a second embodiment.

FIG. 5A is a schematic cross-sectional view of the stereoscopic image display device 212; and FIG. 5B is a schematic top view illustrating the configuration of a portion of the stereoscopic image display device 212.

In the stereoscopic image display device 212 of this example as shown in FIG. 5A and FIG. 5B, the first substrate unit 11s of a liquid crystal optical apparatus 112 further includes multiple electrode pairs 25. The multiple electrode pairs 25 are respectively provided in spaces between the multiple first electrodes 21 on the first major surface 11a. The multiple electrode pairs 25 are arranged in the second direction (the X-axis direction). The multiple first electrodes 21 include the main body portion 41 and the tip portion 42.

Each of the multiple electrode pairs 25 includes a third electrode 23 and a fourth electrode 24. The third electrode 23 extends in the Y-axis direction (the first direction). The fourth electrode 24 extends in the Y-axis direction. In the liquid crystal optical apparatus 112, an insulating layer 46 is provided between the third electrode 23 and the fourth electrode 24. The insulating layer 46 also is provided between the first substrate 11 and the first electrode 21. For example, the insulating layer 46 is provided on the first substrate 11 to cover the fourth electrode 24 and the first major surface 11a. The multiple first electrodes 21 and the multiple third electrodes 23 are provided on the insulating layer 46. The insulating layer 46 may be continuous between the multiple electrode pairs 25. In this example, the insulating layer 46 extends between the first electrode 21 and the first substrate 11.

FIGS. 5A and 5B show two of the multiple first electrodes 21. The number of the multiple first electrodes 21 is arbitrary.

Two most proximal first electrodes 21 of the multiple first electrodes 21 will now be focused upon. A central axis 49 is between the most proximal first electrodes 21. The central axis 49 passes through the midpoint of a line connecting the X-axis direction centers of the two most proximal first electrodes 21. The central axis 49 is parallel to the Y-axis direction.

An electrode 21p which is one of the two most proximal first electrodes 21 will now be focused upon. A position 29 of the electrode 21p is the position of the X-axis direction center of the first electrode 21.

The region of the first major surface 11a between the central axis 49 and the electrode 21p which is the one of the two most proximal first electrodes 21 is taken as a first region R1. The region of the first major surface 11a between the central axis 49 and an electrode 21q which is the other of the two most proximal first electrodes 21 is taken as a second region R2. The direction from the central axis 49 toward the electrode 21p is taken as the +X direction. The direction from the central axis 49 toward the electrode 21q corresponds to the −X direction.

In this example, one electrode pair 25 is provided in the first region R1. Also, one other electrode pair 25 is provided in the second region R2. The multiple electrode pairs 25 are separated from each other when projected onto the X-Y plane. A region where electrodes are not provided exists between the electrode pairs 25. In the embodiment, other electrodes may be further provided between the electrode pairs 25.

In the one electrode pair 25, the third electrode 23 has a first superimposed portion 23p overlaying the fourth electrode 24 when projected onto a plane (the X-Y plane) parallel to the first direction and the second direction and a first non-superimposed portion 23q not overlaying the fourth electrode 24 when projected onto the X-Y plane. In the one electrode pair 25, the fourth electrode 24 has a second superimposed portion 24p overlaying the third electrode 23 when projected onto the X-Y plane and a second non-superimposed portion 24q not overlaying the fourth electrode 24 when projected onto the X-Y plane.

In the electrode pair 25 included in the first region R1 of the liquid crystal optical apparatus 112, the first superimposed portion 23p is disposed between the second superimposed portion 24p and the liquid crystal layer 30. The position of the third electrode 23 is shifted in the X-axis direction from the position of the fourth electrode 24. Specifically, in the one electrode pair 25, the distance between the second non-superimposed portion 24q and the central axis 49 is longer than the distance between the first non-superimposed portion 23q and the central axis 49. In other words, in the one electrode pair 25, the third electrode 23 is more proximal to the central axis 49 than is the fourth electrode 24.

The disposition of the electrode pair 25 in the second region R2 substantially has line symmetry with the central axis 49 as the axis of symmetry. However, the line symmetry may not be rigorous. For example, a micro asymmetry may be introduced based on the distribution of the arrangement (e.g., the pretilt angle, etc.) of the liquid crystal layer 30.

In the case where the liquid crystal optical apparatus 112 is switched from the first state to the second state, the drive unit 130 applies, for example, a first voltage between the first electrode 21 and the second electrode 22, a third voltage between the third electrode 23 and the second electrode 22, and a fourth voltage between the fourth electrode 24 and the second electrode 22. For convenience herein, even in the case where the potential difference between the electrodes is zero, this is described as a voltage (a voltage of 0 volts) being applied. The absolute value of the first voltage is larger than the absolute value of the fourth voltage. The absolute value of the third voltage is larger than the absolute value of the fourth voltage. In the case where these voltages are alternating current, the effective value of the first voltage is greater than the effective value of the fourth voltage. The effective value of the third voltage is greater than the effective value of the fourth voltage. For example, the effective value of the first voltage may be set to be greater than the effective value of the fourth voltage.

When the voltage is applied as recited above, the alignment of the liquid crystal molecules 35 that was the horizontal alignment approaches the vertical alignment in the portion of the liquid crystal layer 30 where the first electrode 21 opposes the second electrode 22. The liquid crystal molecules 35 remain in the horizontal alignment in the portion of the liquid crystal layer 30 proximal to the center of the two adjacent (e.g., most proximal) first electrodes 21. The alignment of the liquid crystal molecules 35 that was the horizontal alignment approaches the vertical alignment in the portion of the liquid crystal layer 30 where the second electrode 22 opposes the third electrode 23. The liquid crystal molecules 35 remain in the horizontal alignment in the portion of the liquid crystal layer 30 where the second electrode 22 opposes the second non-superimposed portion 24q of the fourth electrode 24.

The refractive index gradually increases from the first electrode 21 toward the fourth electrode 24 in the portion between the first electrode 21 and the fourth electrode 24. The refractive index abruptly decreases from the fourth electrode 24 toward the third electrode 23 proximal to the boundary between the second non-superimposed portion 24q and the first superimposed portion 23p. The refractive index gradually increases from the third electrode 23 toward the central axis 49 in the portion between the third electrode 23 and the central axis 49. Accordingly, when the voltage is applied as recited above, the liquid crystal layer 30 has a refractive index distribution having a Fresnel lens-like configuration in which the refractive index has a jump at the portion where the second electrode 22 opposes the electrode pair 25.

For the liquid crystal optical apparatus 112 in which the refractive index distribution having the Fresnel lens-like configuration is formed in the liquid crystal layer 30, the thickness of the liquid crystal layer 30 can be thinner than that of the liquid crystal optical apparatus 110. The response rate of the liquid crystal layer 30 when switching between the first state and the second state can be increased.

In the liquid crystal optical apparatus 112, the first electrode 21 to which a large absolute value (a large effective value) is applied includes the main body portion 41 and the tip portion 42. Thereby, the propagation of the alignment disorder of the liquid crystal molecules 35 can be suppressed. Accordingly, good optical characteristics are obtained in the liquid crystal optical apparatus 112 as well.

Figure 6:
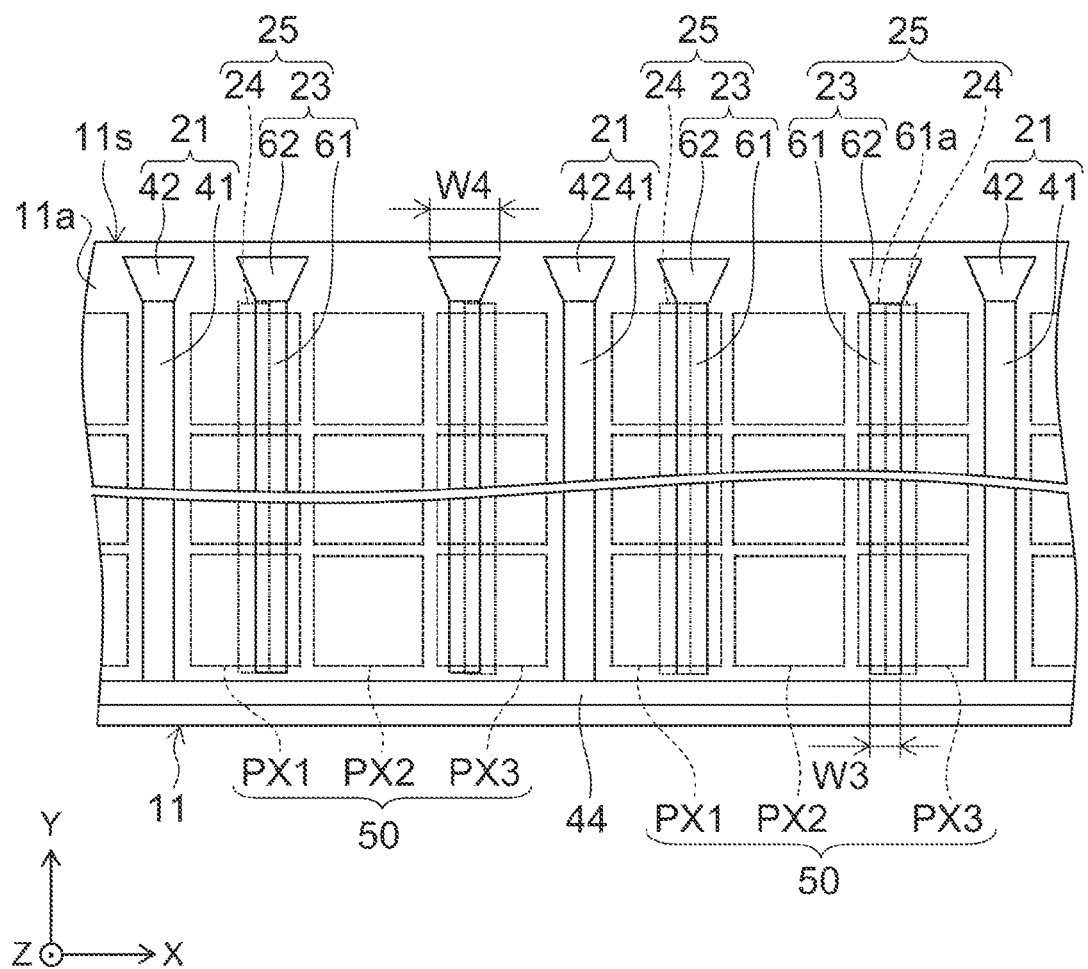
FIG. 6 is a schematic top view of the configuration of a portion of another stereoscopic image display device according to the second embodiment.

FIG. 6 is a schematic top view illustrating the configuration of a portion of another stereoscopic image display device according to the second embodiment.

As shown in FIG. 6, the third electrode 23 may have a main body portion 61 (a second main body portion) and a tip portion 62 (a second tip portion), where the main body portion 61 extends along the Y-axis direction and has a constant width along the X-axis direction, and the tip portion 62 is provided at a tip 61a of the main body portion 61 and has a width along the X-axis direction that is wider than the width of the main body portion 61 along the X-axis direction. The main body portion 61 has a third width W3 along the X-axis direction. The tip portion 62 has a fourth width W4 along the X-axis direction that is wider than the third width. Thus, the third electrode 23 to which the large absolute value (the large effective value) is applied has the main body portion 61 and the tip portion 62. Thereby, the propagation of the alignment disorder of the liquid crystal molecules 35 is more appropriately suppressed; and the optical characteristics of the liquid crystal optical apparatus 112 improve.

The third electrode 23 may be a portion of the first electrode 21. In other words, at least one of the first electrodes 21 may have a first superimposed portion overlaying the fourth electrode 24 and a first non-superimposed portion not overlaying the fourth electrode 24 when projected onto the plane parallel to the first direction and the second direction; and the fourth electrode 24 may have a second superimposed portion overlaying the first electrode 21 and a second non-superimposed portion not overlaying the first electrode 21 when projected onto the plane. For example, the third electrode 23 may be a portion of the first electrode 21; and only the third electrode 23 may have the main body portion 41 and the tip portion 42.

According to the embodiments, a liquid crystal optical apparatus having good optical characteristics and a stereoscopic image display device including the liquid crystal optical apparatus are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in liquid crystal optical apparatuses and stereoscopic image display devices such as first substrate units, second substrate units, liquid crystal layers, first substrates, first electrodes, second substrates, second electrodes, main body portions, tip portions, first end portions, second end portions, first portions, second portions, image display units, and the like from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical apparatuses and stereoscopic image display devices practicable by an appropriate design modification by one skilled in the art based on the liquid crystal optical apparatuses and the stereoscopic image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical apparatus, comprising:
a first substrate unit including:
a first substrate having a first major surface, and
a plurality of first electrodes provided on the first major surface to extend along a first direction, the first electrodes being arranged in a direction non-parallel to the first direction;
a second substrate unit including:
a second substrate having a second major surface opposing the first major surface, and
a second electrode provided on the second major surface to oppose the first electrodes;
a liquid crystal layer provided between the first substrate unit and the second substrate unit; and
a drive unit electrically connected to the first electrodes and the second electrode, the drive unit performing a formation of a refractive index distribution in the liquid crystal layer by applying a voltage between the first electrodes and the second electrode, the refractive index distribution having a lens configuration between the first electrodes, at least one of the first electrodes including:
a first main body portion extending along the first direction, the first main body portion having a first width along a second direction parallel to the first major surface and perpendicular to the first direction; and
a first tip portion provided at a tip of the first main body portion, the first tip portion having a second width along the second direction wider than the first width.

2. The apparatus according to claim 1, wherein
the first tip portion includes a first end portion and a second end portion,
the first end portion is connected to the tip of the first main body portion,
the first end portion is disposed between the tip and the second end portion in the first direction, and
a width of the first tip portion along the second direction increases monotonously from the first end portion toward the second end portion.

3. The apparatus according to claim 2, wherein a position of a center of the first tip portion in the second direction varies from the first end portion toward the second end portion.

4. The apparatus according to claim 3, wherein
the first substrate unit further includes an alignment film provided between the first substrate and the liquid crystal layer, an alignment processing from one second direction toward one other second direction being performed on the alignment film, and
the second-direction position of the second-direction center of the first tip portion approaches the one second direction from the first end portion toward the second end portion.

5. The apparatus according to claim 1, wherein a length of the first tip portion along the first direction is greater than the first width of the first main body portion along the second direction.

6. The apparatus according to claim 1, wherein the first tip portion has a first portion and a second portion branching from the first portion.

7. The apparatus according to claim 1, wherein the first width is constant.

8. The apparatus according to claim 1, wherein a change amount of the first width is not more than ±5%.

9. The apparatus according to claim 1, wherein
the first substrate unit further includes a connection unit connected to an end portion of the first main body portion on a side opposite to the tip, the connection unit being used for an electrical connection of the first electrode, and
a width of the connection unit along the second direction is wider than the first width of the first main body portion along the second direction.

10. The apparatus according to claim 1, wherein the first width is not less than 5 μm and not more than 200 μm.

11. The apparatus according to claim 1, wherein a distance along the second direction between second-direction centers of the first electrodes is not less than 4 times the first width and not more than 20 times the first width.

12. The apparatus according to claim 1, wherein a length of the first main body portion along the first direction is not less than 50 mm and not more than 2000 mm.

13. The apparatus according to claim 1, wherein the liquid crystal layer has a horizontal alignment in a state in which a voltage is not applied to the first electrode and the second electrode.

14. A liquid crystal optical apparatus, comprising:
a first substrate unit including:
a first substrate having a first major surface, and
a plurality of first electrodes provided on the first major surface to extend along a first direction, the first electrodes being arranged in a direction non-parallel to the first direction;
a second substrate unit including:
a second substrate having a second major surface opposing the first major surface, and
a second electrode provided on the second major surface to oppose the first electrodes; and
a liquid crystal layer provided between the first substrate unit and the second substrate unit,
at least one of the first electrodes including:
a first main body portion extending along the first direction, the first main body portion having a first width along a second direction parallel to the first major surface and perpendicular to the first direction; and
a first tip portion provided at a tip of the first main body portion, the first tip portion having a second width along the second direction wider than the first width,
the first substrate unit further including a plurality of electrode pairs provided on the first major surface, the electrode pairs being arranged in the second direction,
at least one of the electrode pairs being disposed in each of spaces between the first electrodes,
the at least one of the electrode pairs including:
a third electrode extending in the first direction,
a fourth electrode extending in the first direction, and
an insulating layer provided between the third electrode and the fourth electrode,
the third electrode including:
a first superimposed portion overlaying the fourth electrode when projected onto a plane parallel to the first direction and the second direction, and
a first non-superimposed portion not overlaying the fourth electrode when projected onto the plane, and
the fourth electrode including:
a second superimposed portion overlaying the third electrode when projected onto the plane, and
a second non-superimposed portion not overlaying the third electrode when projected onto the plane.

15. The apparatus according to claim 14, wherein the third electrode includes
a second main body portion extending along the first direction, the second main body portion having a third width along the second direction, and
a second tip portion provided at a tip of the second main body portion, the second tip portion having a fourth width along the second direction wider than the third width.

16. A stereoscopic image display device, comprising:
a liquid crystal optical apparatus; and
an image display unit stacked with the liquid crystal optical apparatus, the image display unit having a display surface configured to display an image,
the liquid crystal optical apparatus including:
a first substrate unit including
a first substrate having a first major surface, and
a plurality of first electrodes provided on the first major surface to extend along a first direction, the first electrodes being arranged in a direction non-parallel to the first direction;
a second substrate unit including
a second substrate having a second major surface opposing the first major surface, and
a second electrode provided on the second major surface to oppose the first electrodes; and
a liquid crystal layer provided between the first substrate unit and the second substrate unit,
at least one of the first electrodes including:
a first main body portion extending along the first direction, the first main body portion having a first width along a second direction parallel to the first major surface and perpendicular to the first direction; and
a first tip portion provided at a tip of the first main body portion, the first tip portion having a second width along the second direction wider than the first width.

17. The device according to claim 16, wherein at least a portion of the first tip portion does not overlay the display surface when projected onto a plane parallel to the first direction and the second direction.

18. The device according to claim 16, wherein the image display unit is configured to emit light from the display surface, the light being in a linearly polarized light state having a polarizing axis in the second direction and including an image to be displayed.

19. The device according to claim 16, further comprising a drive unit configured to apply a voltage between the first electrodes and the second electrode,
an alignment of a liquid crystal of the liquid crystal layer between the first electrodes and the second electrode being configured to change due to the voltage.

20. The device according to claim 16, further comprising a drive unit,
the first substrate unit further including a plurality of electrode pairs provided on the first major surface, the electrode pairs being arranged in the second direction,
at least one of the electrode pairs being disposed in each of spaces between the first electrodes,
the at least one of the electrode pairs including:
a third electrode extending in the first direction;
a fourth electrode extending in the first direction; and
an insulating layer provided between the third electrode and the fourth electrode,
the third electrode including:
a first superimposed portion overlaying the fourth electrode when projected onto a plane parallel to the first direction and the second direction; and
a first non-superimposed portion not overlaying the fourth electrode when projected onto the plane,
the fourth electrode including:
a second superimposed portion overlaying the third electrode when projected onto the plane; and
a second non-superimposed portion not overlaying the third electrode when projected onto the plane,
the drive unit being configured to apply a first voltage between the second electrode and the first electrodes, apply a third voltage between the third electrode and the second electrode, and apply a fourth voltage between the fourth electrode and the second electrode,
an effective value of the first voltage being greater than an effective value of the third voltage,
the effective value of the first voltage being greater than an effective value of the fourth voltage, and
the effective value of the third voltage being greater than the effective value of the fourth voltage.

* * * * *